United States Patent [19]
Baba

[11] 3,884,559
[45] May 20, 1975

[54] MIRROR FOR INTERIOR DECORATIVE USE

[75] Inventor: Yuji Baba, Tokyo, Japan

[73] Assignees: Nippon Steel Glass Co. Ltd., Osaka; Uni Design Co. Ltd., Tokyo, both of Japan

[22] Filed: Mar. 19, 1973

[21] Appl. No.: 342,883

[52] U.S. Cl. ................................. 350/288; 40/135
[51] Int. Cl. ............................................ G02b 5/08
[58] Field of Search ...... 350/288, 144, 321; 40/135; D86/10 H

[56] References Cited
UNITED STATES PATENTS

| | | | |
|---|---|---|---|
| 809,698 | 1/1906 | Kelley | 40/135 |
| 1,053,937 | 2/1913 | Anderson | 40/135 |
| 1,451,774 | 4/1923 | Holbrook | 350/288 |
| 2,768,460 | 10/1956 | Northrup | 40/135 |
| 3,205,598 | 9/1965 | Grosse | 40/135 |

Primary Examiner—Alfred E. Smith
Assistant Examiner—Michael J. Tokar

[57] ABSTRACT

A mirror adapted for use in interior decoration provided with a pattern of one or two superposed colored layers on a transparent glass plate, said pattern consisting of a plurality of dots or lines spaced an appropriate distance from one another, thus adding to the decorative effect of the mirror, particularly when viewed aslant with respect to the axis normal to the surface of the mirror, without hindering the primary function of the mirror.

13 Claims, 6 Drawing Figures

3,884,559
FIG. Ia
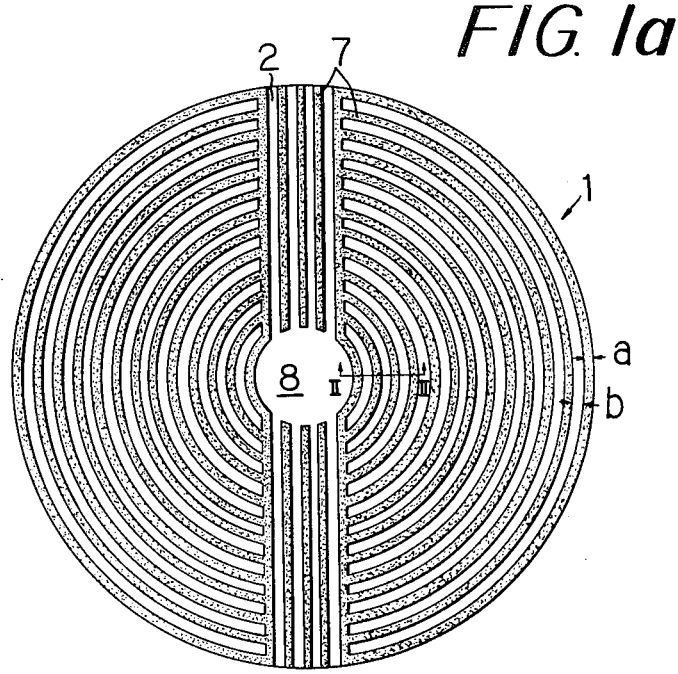
FIG. Ib
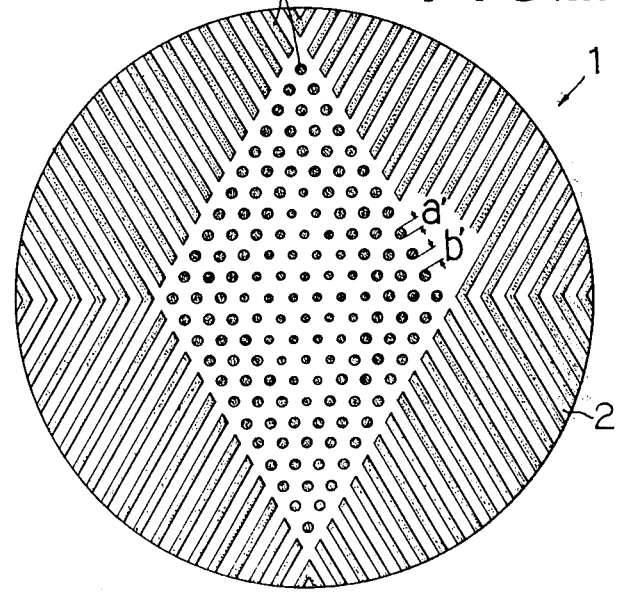

MIRROR FOR INTERIOR DECORATIVE USE

BACKGROUND OF THE INVENTION

1. Field of the Invention

This invention relates to a mirror for use in interior decoration of a room, and more particularly to a mirror provided with a colored pattern on its surface while maintaining the primary function of a mirror.

2. Description of Prior Art

Hitherto, a mirror positioned on a wall of a room or a piece of furniture did not serve any particular purpose other than reflecting one's image or creating a desired distortion in the size of a room, with no appreciable degree of decorative effect on the interior of a room. For such a purpose, there has already been proposed a mirror which has a picture or a pattern painted on the back surface of the glass before placing the reflecting or metal-evaporated layer thereon to thereby prevent the peeling of such picture or pattern. Conventionally, such a picture or pattern covers only part of the mirror so as not to hinder its primary function, thus failing to present sufficient decorative effect for the interior of a room.

SUMMARY OF THE INVENTION

Accordingly, it is an object of the present invention to provide a mirror which presents excellent interior-decorative effect without hindering the primary function thereof.

It is a further object of the invention to provide a mirror which presents varying decorative effects, particularly when viewed from a slant or oblique direction.

Briefly stated, it has now been found that the foregoing and other objects can be readily attained in a mirror which comprises a glass plate with its front surface having a colored pattern consisting of one or two colored layers and with its back surface having a reflecting or metal-evaporated layer, said colored pattern consisting of a plurality of dots or lines spaced at a distance from one another and having a width substantially equal to the thickness of a transparent plate, thereby retaining the primary function of the mirror, i.e., its reflecting properties. Furthermore, such two layers may be of different colors such that, when viewed obliquely with respect to the axis normal to the front surface of the mirror, the colored surfaces of the rear layer of the pattern may present reflected an image of a color different from that of the front or top layer of the pattern. The spacings among the plurality of dots or lines should be such that, when viewed therethrough, one can still recognize clearly any desired portion of one's image.

BRIEF DESCRIPTION OF THE DRAWINGS

The objects of the present invention will become more apparent from the detailed description thereof with reference to the accompanying drawings, in which:

FIGS. 1 (a) and (b) are plan views showing one embodiment of a mirror of the invention;

DESCRIPTION OF THE PREFERRED EMBODIMENTS

Figure 2A:
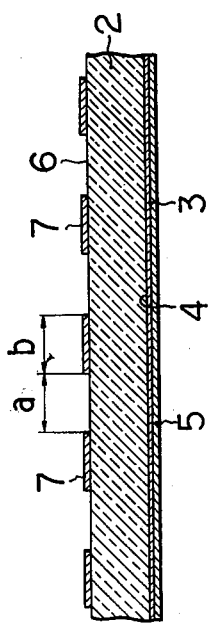
FIGS. 2 (a) and (b) are cross-sectional views of the mirror of the invention, taken along lines II—II of FIG. 1 and showing a mirror having a colored layer of different pattern.

Referring now to FIGS. 1(a) and (b) and FIGS. 2(a) and (b), a mirror plate 1 comprises a transparent plate 2 provided with a reflecting surface 4 on its back surface, said reflecting surface 4 being a metal-evaporated film 3 covered with a protective film 5. The shape of the mirror may be circular or rectangular, or of any other shape and dimension.

On the surface of the mirror, i.e., the surface 6 of the transparent plate 2 there is a non-transparent colored layer 7 of a pattern consisting of a plurality of dots and lines (see FIG. 1(b)) which serves for decorative purpose. In general, the lines defining such a pattern or colored layer 7 are arranged parallel to one another and may be straight or curved lines. Furthermore, these lines may intersect one another. Preferably, the spacing $a$ between any two adjacent lines is substantially the same as the width $b$ of such a line. Alternatively, as shown in FIG. 1 (b), dots may be used in place of such lines, the distance $b'$ of one dot from another preferably being equal to the diameter $a'$ of such a dot. In this connection, the diameter $a'$ of a dot or the width $b'$ a of a line should preferably range from 1 to 10 mm which corresponds to the thickness of a transparent plate, while the area occupied by the colored layer should preferably not exceed one half the total area of the mirror.

The diameter $b'$ of the dots or the width $a$ of the lines, as well as the respective spacings $a$ and $b'$ between lines or dots, need not always be constant throughout the entire surface of the mirror. Alternatively, the colored pattern may be applied to the surface of the mirror with a central portion 8 thereof left untouched, or it may be applied to the entire surface of the mirror. The central portion 8 is not provided merely for the primary function of the mirror, whether such a central portion 8 should be provided being merely a matter of design. Thus, in either case, the entire surface of the mirror will not hinder the primary reflective purpose thereof.

Figure 2B:
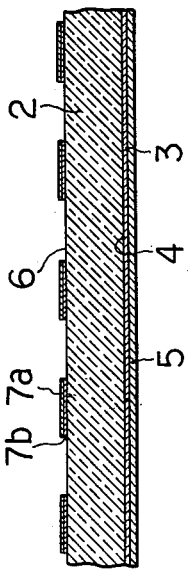

The colored layer may be of a single layer as shown in FIG. 2(a) or may be of two superposed layers of different colors 7a and 7b as shown in FIG. 2(b), such that the back surface of the pattern may present an image of a color different from that of the top layer, thereby greatly improving the decorative effect, when viewed obliquely with respect to the axis normal to the surface of the mirror.

Any type of non-transparent ink or paint may be used for producing the colored pattern on the surface of the transparent plate 2. However such a colored layer may be best prepared by using a process such as for silk-screen printing. The manner in which the mirror is then positioned onto a wall of a room is inconsequential with respect to the invention and forms no part thereof.

In practical use, as when one's face is reflected on the reflecting portion of the mirror, one can see one's image with ease simply by focusing one's eyes on one's image, despite of the presence of the colored pattern on the surface of the mirror. This can visualized as being a phenomenon similar to when one can observe an object without difficulty through reticulate network or through a transparent plate having a colored pattern of closely spaced fine lines.

Figure 3:
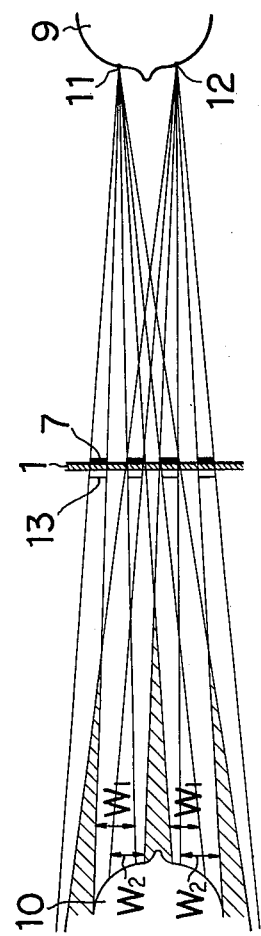
FIG. 3 is a schematic representation illustrating the relationship of one's eye to the mirror of the present invention, particularly with respect to the dead angle of vision when viewed obliquely.

Turning now to FIG. 3, when a person designated by the reference character 9 observes his or her image 10 reflected on the reflecting layer of the mirror 1, while directly facing the mirror, there result overlapped portions between the areas $w_1$ and $w_2$, $w_1$ being the zone which the person can actually see with one eye 11, and $w_2$ being the zone which the person can see with the other eye 12, although the zone of dead angle can be greatly minimized as shown by the hatched or shaded area. On the other hand, the area within the dead angle may be observed by moving the face somewhat to the left or right. The dead angle thus described will not hinder the primary purpose of the mirror, except in a rare case where a person wants to see finer details of his or her face. Shown at 13 is a colored layer.

Figure 4:
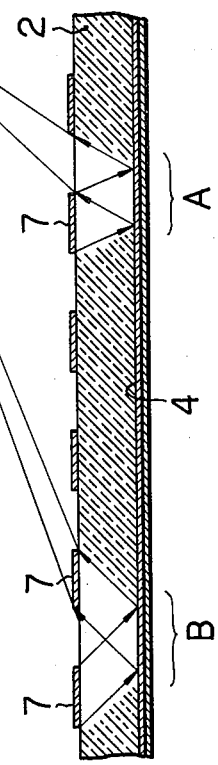
FIG. 4 is an enlarged cross-sectional view of a mirror of the invention, illustrating the relationship of one's eye to the reflected back surface of a pattern of one or more colors.

When observing the mirror from an oblique or slant direction, see FIG. 4, one can see not only the top surface 7 of the colored layer on the surface of the mirror but also the back surface A of the colored layer which has been reflected on the reflecting layer of the mirror. On the other hand, depending on the different angle of vision, one can see only the top colored surface 7 of the pattern, because the reflected image of the back surface of a dot or line is superposed on the other dot or line, as shown at B. Accordingly, the mirror of the present invention can present varying optical patterns depending on the varying angle of vision of a person facing the mirror, with a resultant enhanced and synergistic decorative effect.

It may be advantageous for attaining maximum decorative effect to place the colored lines in a vertical direction, when the mirror is to be hung on a wall of a room at normal eye level.

As is apparent from the foregoing description, the mirror of the present invention affords excellent decorative effects, because of the synergistic effect given by the colored top layer of a pattern and the reflected image of the differently colored back surface of the pattern, the decorative effect varying with the angle of vision of a person with respect to the mirror. It should be appreciated, however, that when observing one's reflected image, such a pattern will not hinder the primary function of the mirror as mentioned hereabove.

While the present invention has been described with particular reference to certain exemplary embodiments thereof, it is to be understood that variations, modifications and alternations may be effected without departing from the spirit and the scope of the present invention, as defined in the appended claims.

What is claimed is:

1. A mirror for interior decorative use, said mirror comprising a transparent glass sheet having a front surface and a rear surface; at least one layer of a colored pattern on said front surface; and an image-reflecting layer on said rear surface, said colored layered pattern comprising a plurality of discreet areas each having a width substantially the same as the spacing between adjacent ones of said discreet areas with said discreet areas and said spacing therebetween being substantially equal to the thickness of said transparent glass sheet.

2. The mirror according to claim 1 wherein said discreet areas are dots.

3. The mirror according to claim 1 wherein said discreet areas are lines.

4. The mirror according to claim 3 wherein said lines are straight.

5. The mirror according to claim 3 wherein said lines are arcuate.

6. The mirror according to claim 1 wherein said discreet areas are a combination of straight and arcuate lines.

7. The mirror according to claim 1 wherein said discreet areas are a combination of lines and dots.

8. The mirror according to claim 1 wherein said central area of said mirror is free of said discreet areas.

9. The mirror according to claim 1 wherein said discreet areas, the spacing between said discreet areas and the thickness of said transparent glass sheet are in the order of from 1 to 10 millimeters.

10. The mirror according to claim 1 wherein said total area of said discreet areas does not exceed approximately one-half the total area of said mirror.

11. The mirror according to claim 1 wherein the size of said discreet areas is not constant.

12. The mirror according to claim 1 wherein said spacing between said discreet areas is not constant.

13. The mirror as set forth in claim 1, wherein two colored layers are provided superposed one on top of the other and of different colors, thereby forming the outer and inner layers of said colored pattern, respectively.

* * * * *

UNITED STATES PATENT OFFICE
CERTIFICATE OF CORRECTION

PATENT NO. : 3,884,559
DATED : May 20, 1975
INVENTOR(S) : Yuji Baba

It is certified that error appears in the above-identified patent and that said Letters Patent are hereby corrected as shown below:

The first assignee "Nippon Steel Glass Co., Ltd."

should read --Nippon Sheet Glass Co., Ltd.--

Signed and Sealed this fourth Day of November 1975

[SEAL]

Attest:

RUTH C. MASON
Attesting Officer

C. MARSHALL DANN
Commissioner of Patents and Trademarks